(12) United States Patent
Ito et al.

(10) Patent No.: US 11,301,785 B2
(45) Date of Patent: Apr. 12, 2022

(54) OPERATING SYSTEM FOR VEHICLE-SHARING SERVICE

(71) Applicants: DENSO CORPORATION, Kariya (JP); National University Corporation Nagoya University, Nagoya (JP)

(72) Inventors: Akira Ito, Kariya (JP); Tatsuya Suzuki, Nagoya (JP); Shinkichi Inagaki, Nagoya (JP); Akihiko Kawashima, Nagoya (JP)

(73) Assignees: DENSO CORPORATION, Kariya (JP); National University Corporation Nagoya University, Nagoya (JP)

( * ) Notice: Subject to any disclaimer, the term of this patent is extended or adjusted under 35 U.S.C. 154(b) by 777 days.

(21) Appl. No.: 16/082,310

(22) PCT Filed: Jan. 12, 2017

(86) PCT No.: PCT/JP2017/000840
§ 371 (c)(1),
(2) Date: Sep. 5, 2018

(87) PCT Pub. No.: WO2017/154341
PCT Pub. Date: Sep. 14, 2017

(65) Prior Publication Data
US 2019/0087753 A1    Mar. 21, 2019

(30) Foreign Application Priority Data
Mar. 9, 2016  (JP) .............................. JP2016-045920

(51) Int. Cl.
*G06Q 10/02* (2012.01)
*B60L 53/66* (2019.01)
(Continued)

(52) U.S. Cl.
CPC ............ *G06Q 10/02* (2013.01); *B60L 53/665* (2019.02); *B60L 58/12* (2019.02); *G06Q 50/10* (2013.01); *G06Q 50/30* (2013.01)

(58) Field of Classification Search
CPC .............................. G06Q 10/02; G06Q 50/06
See application file for complete search history.

(56) References Cited

FOREIGN PATENT DOCUMENTS

| JP | 2014041475 A | 3/2014 |
|---|---|---|
| JP | 2015052984 A | 3/2015 |
| JP | 2015069584 A | 4/2015 |

OTHER PUBLICATIONS

Lee et al., "Shared Solar-Powered EV Charging Stations: Feasibility and Benefits", Conference: 2016 Seventh International Green and Sustainable Computing Conference (IGSC) (Year: 2016).*

(Continued)

*Primary Examiner* — Emmett K. Walsh
(74) *Attorney, Agent, or Firm* — Harness, Dickey & Pierce, P.L.C.

(57) ABSTRACT

An operating system for a vehicle-sharing service includes: a reservation input unit configured to input a usage reservation of an electric vehicle made by a user; a reservation result sending unit; a charging plan creating unit configured to create a charging plan for the electric vehicle; and a cost calculating unit configured to calculate an operation cost of the vehicle-sharing service based on a prediction of an available solar power supply. The charging plan creating unit creates the charging plan such that the operation cost of the vehicle-sharing service has a minimum cost under a predetermined acceptance condition. The result sending unit sends, to the user, a reservation result indicating that the usage reservation is unacceptable when the operation cost calculated according to the charging plan does not satisfy the predetermined acceptance condition.

6 Claims, 6 Drawing Sheets

(51) Int. Cl.
*B60L 58/12* (2019.01)
*G06Q 50/10* (2012.01)
*G06Q 50/30* (2012.01)

(56) References Cited

OTHER PUBLICATIONS

Cherry, Christopher, Worley, Stacy, and Jordan, David. Electric Bike Sharing—System Requirements and Operational Concepts. United States: N. p., 2010. Web. doi:10.2172/1024211. (Year: 2010).*

* cited by examiner

OPERATING SYSTEM FOR VEHICLE-SHARING SERVICE

CROSS REFERENCE TO RELATED APPLICATIONS

This application is a U.S. National Phase Application under 35 U.S.C. 371 of International Application No. PCT/JP2017/000840 filed on Jan. 12, 2017 and published in Japanese as WO/2017/154341 A1 on Sep. 14, 2017. This application is based on and claims the benefit of priority from Japanese Patent Application No. 2016-045920 filed on Mar. 9, 2016. The entire disclosures of all of the above applications are incorporated herein by reference.

TECHNICAL FIELD

The present disclosure relates to an operating system for a vehicle-sharing service.

BACKGROUND ART

A vehicle-sharing service is a service for temporarily lending vehicles in response to a request of a user. In recent years, a vehicle-sharing service temporarily lending an electric vehicle has also been put in use.

Multiple stations that serve as windows for borrowing and returning electric vehicles are provided in a service area in which the vehicle-sharing service is available. At each station, for example, multiple electric vehicles are stocked. In this kind of the vehicle-sharing service, the user of the vehicle-sharing service reserves an electric vehicle by performing operations via the Internet, for example. After reservation, borrowing of electric vehicles at the station designated at the time of reservation is performed.

In the following Patent Literature 1, an operation management system for a vehicle-sharing service is described. According to the system, an operation plan indicating which electric vehicle is allocated to which user is created in consideration of the battery charging rate and the like of each electric vehicle. The system can efficiently operate the vehicle-sharing service based on the created operation plan.

PRIOR ART LITERATURE

Patent Literature

Patent Literature 1: JP 2014-41475 A

SUMMARY OF INVENTION

The inventors of the present disclosure have studied a system configuration in which battery charge of an electric vehicle stopped at a station can be performed not only by system power but also by solar power. In this kind of system configuration, since the use of the system power is reduced, the electricity fee associated with the operation of the vehicle-sharing service can be reduced.

Based on the viewpoint of efficient use of solar power, it is preferable that the number of electric vehicles stopped at the station (that is, charging) during the daytime while solar power generation can be performed is as large as possible. Meanwhile, based on the viewpoint of providing the service to more users, it is preferable that the number of electric vehicles stopped at the station (that is, the vehicles not in service) is small as possible. As described above, efficient use of solar power and provision of services to users are mutually contradictory. Regarding the efficient operation while maintaining balance between efficient use of solar power and lending of electric vehicles in response to the request of the user, specific investigation has not been made in the related art.

The present disclosure has been made in consideration of the above-described difficulty, and an object thereof is to provide an operating system which can more efficiently operate a vehicle-sharing service by maintaining balance between efficient use of solar power and the lending of an electric vehicle in response to a request of a user.

According to an aspect of the present disclosure, an operating system for a vehicle-sharing service is provided. The vehicle-sharing service provides a temporary lending of an electric vehicle in response to a request from a user. The electric vehicle is provided from one of a plurality of stations disposed within a specific service area. Each of the plurality of stations has a charging facility which is configured to supply solar power or system power to the electric vehicle for charging the electric vehicle in a time zone while the electric vehicle is not lent out. The operating system includes: a reservation input unit configured to input a usage reservation of the electric vehicle made by the user; a result sending unit configured to send, to the user, a reservation result indicating whether or not the usage reservation is acceptable; a charging plan creating unit configured to create a charging plan for the electric vehicle during a planned time zone, the planned time zone is being a duration in which a charging of the electric vehicle is performed at the one of the plurality of stations; and a cost calculating unit configured to calculate an operation cost of the vehicle-sharing service at least based on a prediction of an available solar power supply from the one of the plurality of stations to the electric vehicle. The charging plan creating unit creates the charging plan such that the operation cost calculated by the cost calculating unit has a minimum cost under a predetermined acceptance condition. When an input of the usage reservation is made by the user, the charging plan creating unit newly creates the charging plan in response to the usage reservation newly input, and the result sending unit sends, to the user, the reservation result indicating that the usage reservation is unacceptable in a case where the operation cost calculated according to the charging plan does not satisfy the predetermined acceptance condition.

In the above-described operating system, when a usage reservation is newly input from the user, a charge and discharge plan is newly created corresponding to the usage reservation, that is, the electric vehicle is lent according to the usage reservation. The charge and discharge plan is created such that the operation cost calculated at least based on the prediction of solar power is minimized under given conditions. As a result, the operation cost is calculated as a predicted value, assuming that the input usage reservation is carried out. When the operation cost calculated as described above does not satisfy a predetermined acceptance condition, a reservation result indicating that the reservation of the vehicle is unacceptable is sent to the user.

In other words, in the above-described operating system, although the operation that responds as much as possible to the request (usage reservation) from the user is basically performed, when the operation cost created while considering the charging or the like by the solar power does not satisfy a predetermined acceptance condition, the operation of exceptionally rejecting the request from the user is performed. The above-described "acceptance condition" is, for example, such that the amount of an increase in the operation cost in response to the input usage reservation is kept equal to or less than a predetermined threshold value.

In the operating system having the above-described configuration, by setting appropriate acceptance conditions, balance between charging efficiently using the solar power and lending of the electric vehicle in response to the request of the user can be maintained. As a result, the vehicle-sharing service can be operated more efficiently.

The present disclosure provides an operating system which can more efficiently operate a vehicle-sharing service by maintaining balance between efficient use of solar power and the lending of the electric vehicle in response to the request of the user.

EMBODIMENTS FOR CARRYING OUT INVENTION

Figure 1:
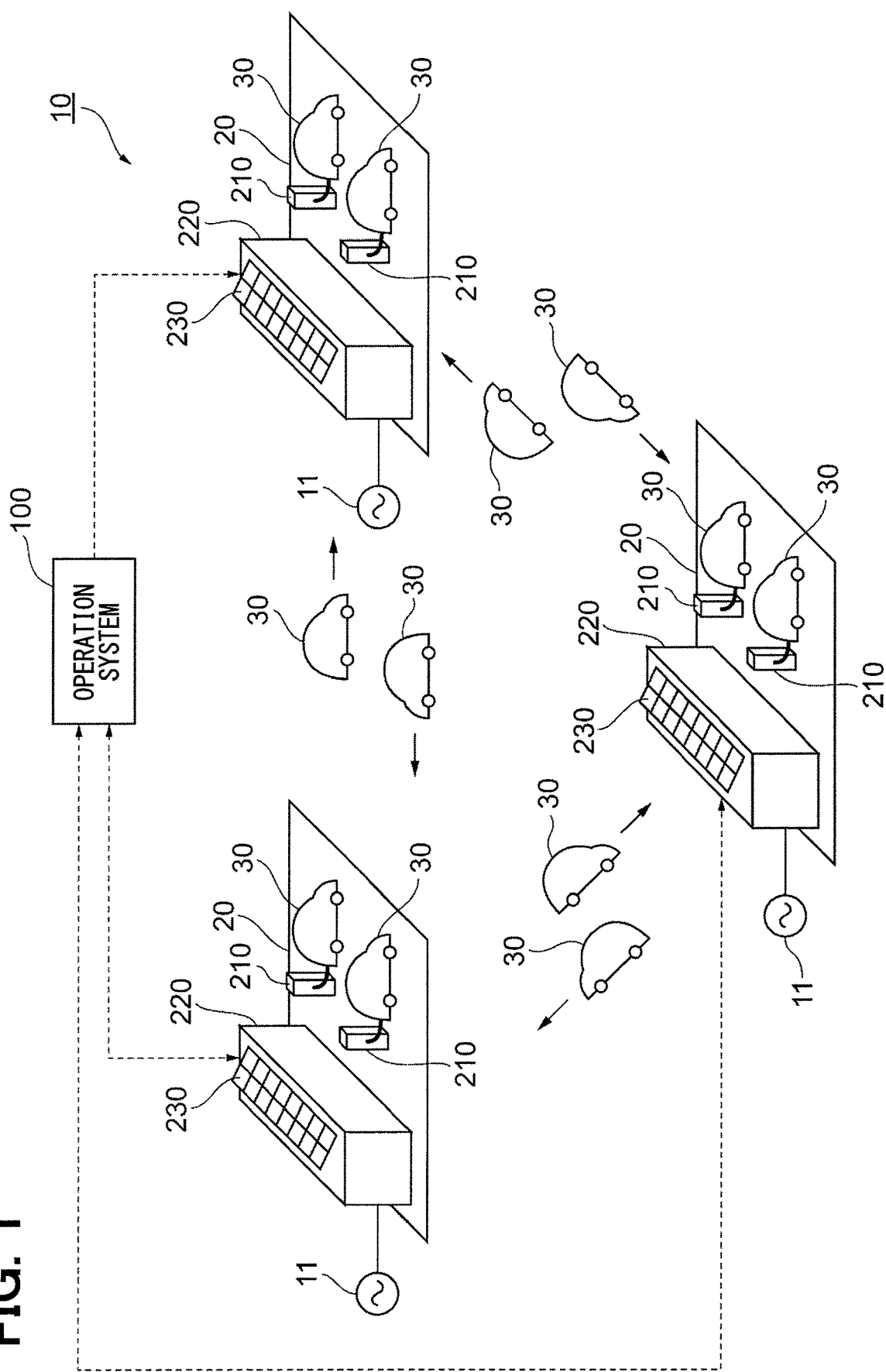
FIG. 1 is a view schematically showing an operating system according to the present embodiment and a configuration necessary for providing a vehicle-sharing service operated by the operating system.

Hereinafter, embodiments of the present disclosure will be described with reference to the attached drawings. In order to make it easy to understand the description, the same reference numerals will be given to the same configuration elements in each drawing as much as possible, and redundant description thereof will be omitted.

The outline of an operating system 100 according to the present embodiment and a vehicle-sharing service provided by the functions of the operating system 100 will be described with reference to FIG. 1. The vehicle-sharing service (hereinafter sometimes simply referred to as "service") is a service to temporarily lend an electric vehicle 30 in response to a request of a user. The components necessary for providing the service include a station 20, the electric vehicle 30, and the operating system 100. In FIG. 1, entire components for the service are schematically shown as a vehicle-sharing system 10.

The station 20 is a facility which serves as a counter where a user of the service visits. Multiple stations 20 are built in a specific region where the service is available, that is, in a service area. The user visits one of the stations 20 and borrows the electric vehicle 30. In addition, after using the electric vehicle 30, the electric vehicle 30 is returned by visiting the station 20 again. The station 20 at the time of borrowing and the station 20 at the time of returning may be the same as each other or may be different from each other.

In the present embodiment, it is assumed that the user reserves the electric vehicle 30 in advance before using the service. In addition, at the time of the reservation, the user designates the station 20 at the time of borrowing, the station 20 at the time of returning, the use start time, and the use end time.

A building 220 is provided in the station 20, and a parking space for parking the electric vehicle 30 is provided around the building 220. The building 220 has a function as a service window for receiving questions and the like from visited users as necessary and a function as an office where administrative work necessary for providing the service is performed. Although three stations 20 are drawn in FIG. 1, the number of stations 20 provided in the service area may be, for example, four or more, and may be two.

A solar panel 230 is provided at a ceiling part of the building 220. The solar panel 230 converts solar energy into electric power as well known. At the station 20, the electric power generated by the solar panel 230 (hereinafter also referred to as "solar power") is supplied to the electric vehicle 30 for charging the electric vehicle 30.

Electric power from an electric power system 11 (hereinafter, also referred to as "system power") is supplied to the station 20. At the station 20, it is also possible to supply the system power to the electric vehicle 30, and thus, to charge the electric vehicle 30.

In the parking space provided around the building 220, multiple parking regions (not shown) partitioned by a white line or the like are provided. In addition, in each of the parking regions, one charging facility 210 is provided. When the electric vehicle 30 is parked in the parking region, that is, when the electric vehicle 30 is not used for service, the charging facility 210 and the electric vehicle 30 are connected to each other by a cable. Electric power is supplied to the electric vehicle 30 via the cable for charging the electric vehicle. The electric power supplied from the charging facility 210 to the electric vehicle 30 is either the solar power or the system power as described above.

Furthermore, in FIG. 1, at each charging station 20, two charging facilities 210 (and the parking regions) are provided for two vehicles, respectively. The number of the charging facilities 210 and the like is not limited the configuration shown in FIG. 1. For example, there may be the station 20 in which only one charging facility 210 and the like is provided, or there may be the station 20 in which three or more charging facilities 210 and the like are provided. Further, the number of charging facilities 210 and the like may be different for each station 20.

The electric vehicle 30 is provided with a storage battery (not shown) disposed inside. The electric vehicle is a vehicle configured to travel with electric power stored in the storage battery. The electric vehicle 30 also includes a power converter (not shown) in addition to the storage battery. The power converter charges the storage battery by converting the electric power supplied from the charging facility 210. At this time, the power converter appropriately adjusts the magnitude of the electric power supplied from the charging facility 210 to the electric vehicle 30 within a predetermined range. Further, the electric vehicle 30 may be a so-called hybrid vehicle including both of a storage battery and an internal combustion engine.

Furthermore, in the present embodiment, it is also possible for the multiple electric vehicles 30 stopped at the same station 20 to interchange the electric power stored in each storage battery. For example, in a state where the electric vehicle 30 is connected to each of the two adjacent charging facilities 210, the electric power discharged from the storage battery of one electric vehicle 30 can be supplied and charged to the storage battery of the other electric vehicle 30 via the charging facility 210.

In the present embodiment, the borrowing and returning of the electric vehicle 30 by the user is necessarily performed at one of the stations 20. In other words, there is no case where the electric vehicle 30 is dropped at places other than the station 20. Therefore, in the time zone in which the vehicle-sharing service is being performed, the electric vehicle 30 may be in a state of being stopped at one of the stations 20 or a state of traveling to a place other than the station 20 at which the user lent the electric vehicle 30.

The operating system 100 is a control device which generally controls the entire vehicle-sharing system 10 in order to operate the vehicle-sharing service. The operating system 100 is configured as a computer-implemented system including a CPU, a ROM, and the like. The operating system may be installed in a specific station 20 or may be installed in a place different from the stations 20. Further, for example, the multiple computer systems which are dispersedly disposed in the multiple stations 20 may cooperate with each other, and thus, the entire systems may function as the operating system 100.

The operating system 100 has a function to receive usage reservation from the user, a function to allocate the electric vehicle 30 to the usage reservation, and the like. The operating system 100 will be described with reference to FIG. 2. The operating system 100 includes a fee presenting unit 110, a reservation input unit 120, a result sending unit 130, a charging plan creating unit 140, and a cost calculating unit 150 as functional control blocks.

Figure 2:
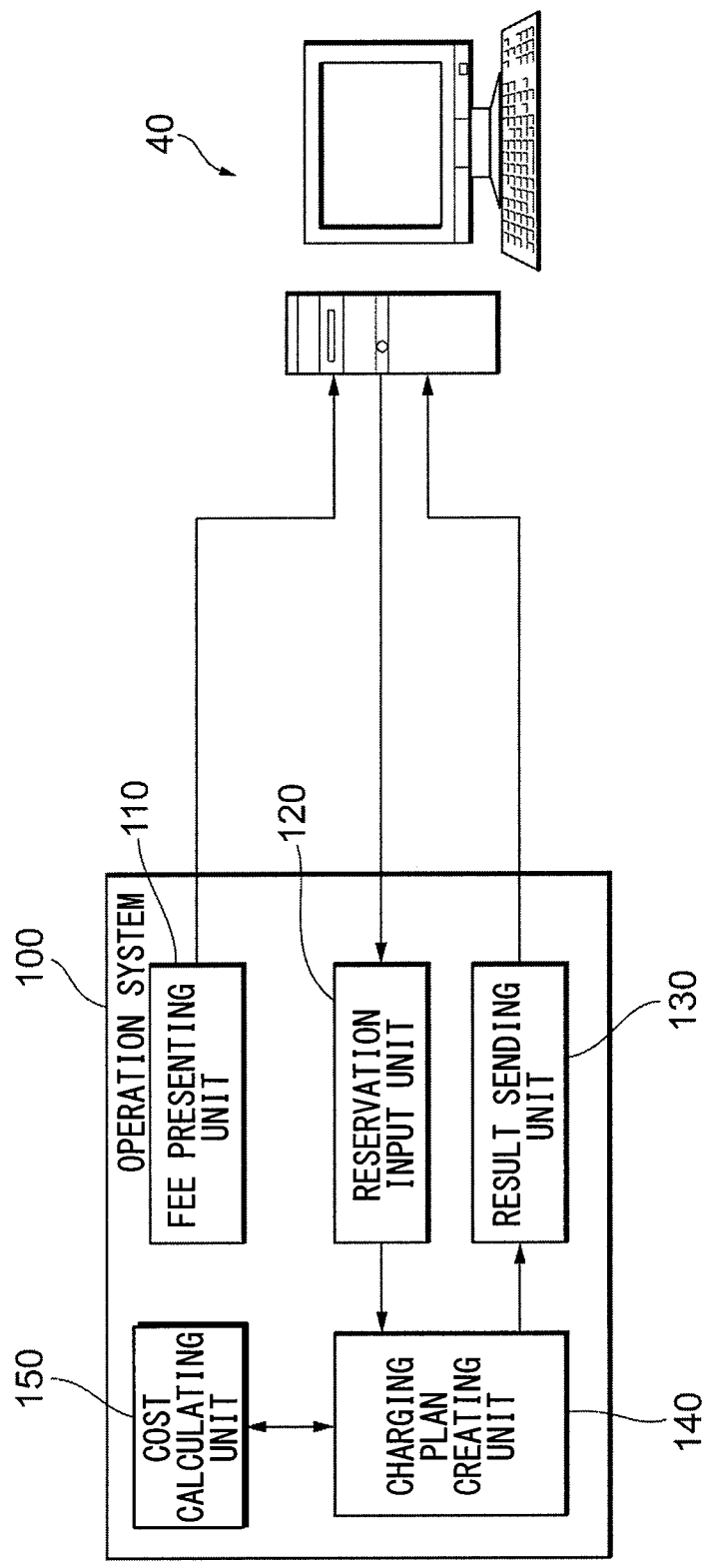
FIG. 2 is a block diagram showing an internal configuration of the operating system of FIG. 1.

Furthermore, in FIG. 2, reference numeral 40 indicates a personal computer installed at home of the user, and is referred to as "personal computer 40". The personal computer 40 is a device that serves as an interface when the user who intends to use the service performs a reservation procedure. As the device for making the reservation, a portable communication terminal, such as a smartphone, may be used instead of the personal computer 40.

The fee presenting unit 110 is a part for communicating with the personal computer 40 of the user via the Internet, together with the reservation input unit 120 and the result sending unit 130 which will be described later. The fee presenting unit 110 sends information on the usage fee of the service to the personal computer 40 and displays the information on the screen of the personal computer 40. In other words, the fee presenting unit 110 corresponds to a part for presenting, to the user, the usage fee necessary for using the electric vehicle 30.

For example, as the usage fee presented to the user by the fee presenting unit 110, an amount proportional to the use time of the electric vehicle 30 is set. Instead of this kind of fee calculation, the amount proportional to the distance travelled after leaving the stations 20 may be set. Further, in the present embodiment, there is a case where the usage fee is set to be different depending on the situation (the position of each electric vehicle 30, and the like) at the point of time when the user makes a reservation, the time zone in which the electric vehicle 30 is used, and the like.

The reservation input unit 120 is a part which receives the usage reservation input into the personal computer 40 by the user from the personal computer 40 via the Internet. As described above, the received usage reservation is information including the station 20 at the time of borrowing, the station 20 at the time of returning, the use start time, and the use end time.

The result sending unit 130 sends, to the personal computer 40, a reservation result indicating whether or not the usage reservation input into the reservation input unit 120 is acceptable, that is, whether or not the electric vehicle 30 can be lent in response to the usage reservation. The reservation result sent from the result sending unit 130 is displayed on the screen of the personal computer 40 and notified to the user. In other words, when the user performs an operation for the usage reservation, the reservation result is sent from the result sending unit 130 as a reply to the operation, and the result is notified to the user.

The reservation result indicating that it is possible to respond to the usage reservation also includes information for specifying the electric vehicle 30 allocated to the reservation. At the use start time, the user visits the station 20 designated by himself or herself as the station 20 at the time of borrowing, and borrows the specific electric vehicle 30 indicated in the reservation result. At this time, an IC card in which the information is registered may be used as a card key for releasing a key lock of the electric vehicle 30.

At the time of the operation of the usage reservation is performed, when the usage reservations have already been input by many other users and it is not possible to lend out the electric vehicle 30, a reservation result indicating that the electric vehicle 30 is not available is sent from the result sending unit 130 to the user. Furthermore, in the present embodiment, even when there is an available electric vehicle 30 is stopped at the station 20 and is not allocated to another usage reservation, a reservation result indicating that it is not possible to respond to the input usage reservation is sent from the result sending unit 130 to the user. This will be described later.

The charging plan creating unit 140 is a part for creating a charging plan. The charging plan is data indicating the time zone in which the charging of the electric vehicle 30 is planned to be performed at the station 20 for each electric vehicle 30. Furthermore, when creating the charging plan, information indicating which electric vehicle 30 is allocated (hereinafter also referred to as "vehicle allocation plan") to which usage reservation accepted so far is also created. Further, at each predetermined time point during the period in which the service is provided, information (hereinafter, also referred to as "vehicle position plan") indicating at which position each of all of the electric vehicles 30 is present is also created.

The cost calculating unit 150 is a part for calculating the operation cost required for operating the vehicle-sharing service. The operation cost includes, for example, an electricity fee for charging the electric vehicle 30 using the system power. In addition, when the distribution of the electric vehicle 30 becomes unbalanced to some of the stations 20, personnel expenses for moving the electric vehicle 30 to another station 20 by the operation of the staff are included in the service operation cost.

Figure 3:
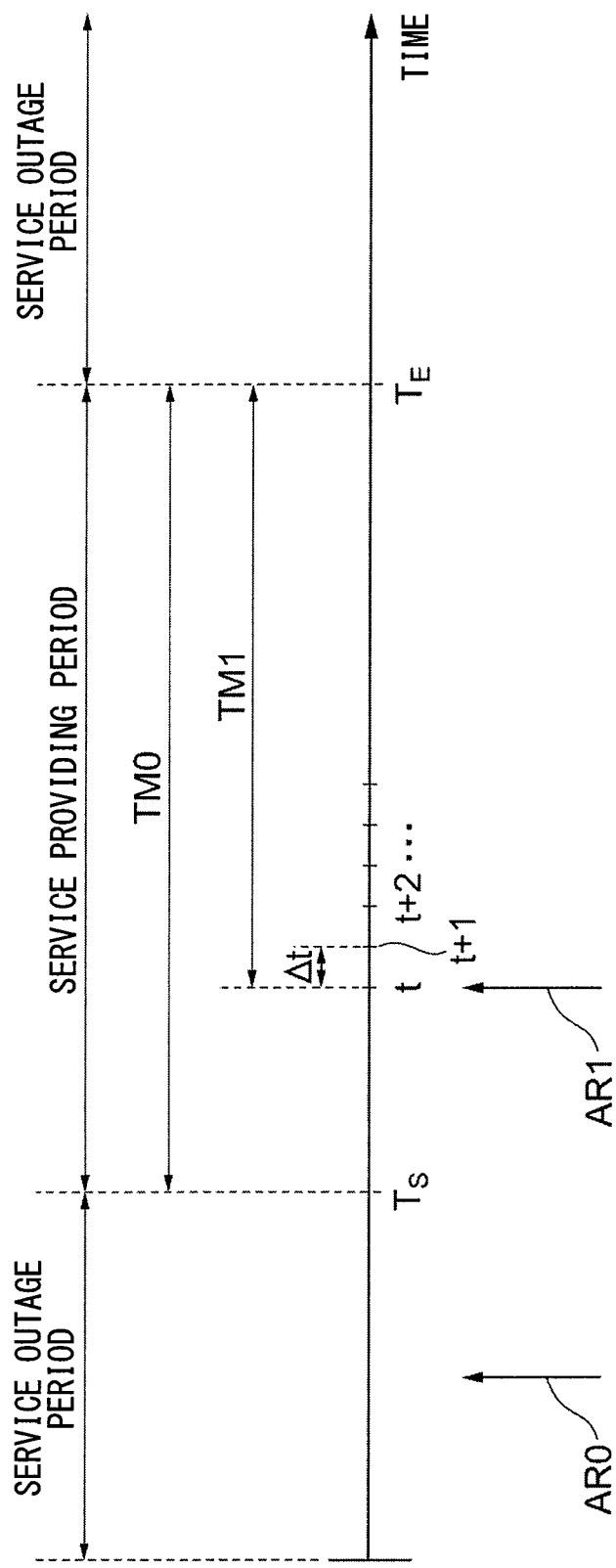
FIG. 3 is a view for describing a time zone in which the vehicle-sharing service is performed.

With reference to FIG. 3, the time zone in which the vehicle-sharing service is provided and the outline of the process performed by the operating system 100 will be described.

The horizontal axis of the time chart shown in FIG. 3 indicates one day (24 hours) as a whole. The time $T_S$ is a time at which the vehicle-sharing service is started, and is set at 8 o'clock in the present embodiment. In addition, the time $T_E$ is a time at which the vehicle-sharing service is finished, and is set at 20 o'clock in the present embodiment. In other words, 12 hours from the time $T_S$ to the time $T_E$ is a service providing period of the vehicle-sharing service. In addition, the period from the time $T_E$ to the time $T_S$ of the next day is a service outage period. It is possible for the user to make the usage reservation in both of the service providing period and the service outage period.

For example, a case where the usage reservation operation is performed in the service outage period as at the time indicated by an arrow AR0 in FIG. 3 will be described. In this case, when the usage reservation is input into the reservation input unit 120, the charging plan creating unit 140 creates a charging plan, a vehicle allocation plan, and a vehicle position plan under the assumption of responding to the usage reservation. Each of the plans is created to indicate the operation plan of the service in the period TM0 which starts from the time $T_S$ and ends at the time $T_E$.

At this time, the operation cost corresponding to the created charging plan is calculated by the cost calculating unit 150. When the operation cost satisfies the predetermined acceptance condition (which will be described later), a message indicating that the usage reservation is acceptable is transmitted to the user.

An operation plan of the service including the charging plan and the like is created each time the usage reservation from the user is input into the reservation input unit 120. In other words, the operation plan of the service in the period from the time $T_S$ to the time $T_E$ is updated every time the usage reservation is input. Accordingly, the allocation of the electric vehicle 30 with respect to all the usage reservations that have been input so far are updated and optimized every time a new reservation is input.

The period after the time $T_S$ is the service providing period and the service provision is started. As the user starts to borrow and return the electric vehicle 30 among the stations, the electric vehicle 30 starts to move among the stations 20. As a result, the number of electric vehicles 30 that are stopped (stocked) at each station 20 changes from the number of electric vehicles 30 in the initial state before the time $T_S$.

For example, a case where the new usage reservation operation is performed in the service providing period as at the time indicated by an arrow AR1 in FIG. 3 will be described. In this case, the same process described above is also performed. In other words, when the usage reservation is input into the reservation input unit 120, the charging plan creating unit 140 creates the charging plan, the vehicle allocation plan, and the vehicle position plan under the assumption of responding to the usage reservation. In this case, the above-described plans are created as the operation plan of the service in a period TM1 from the current time point t when the usage reservation is input into the reservation input unit 120 to the time $T_E$.

Figure 4:
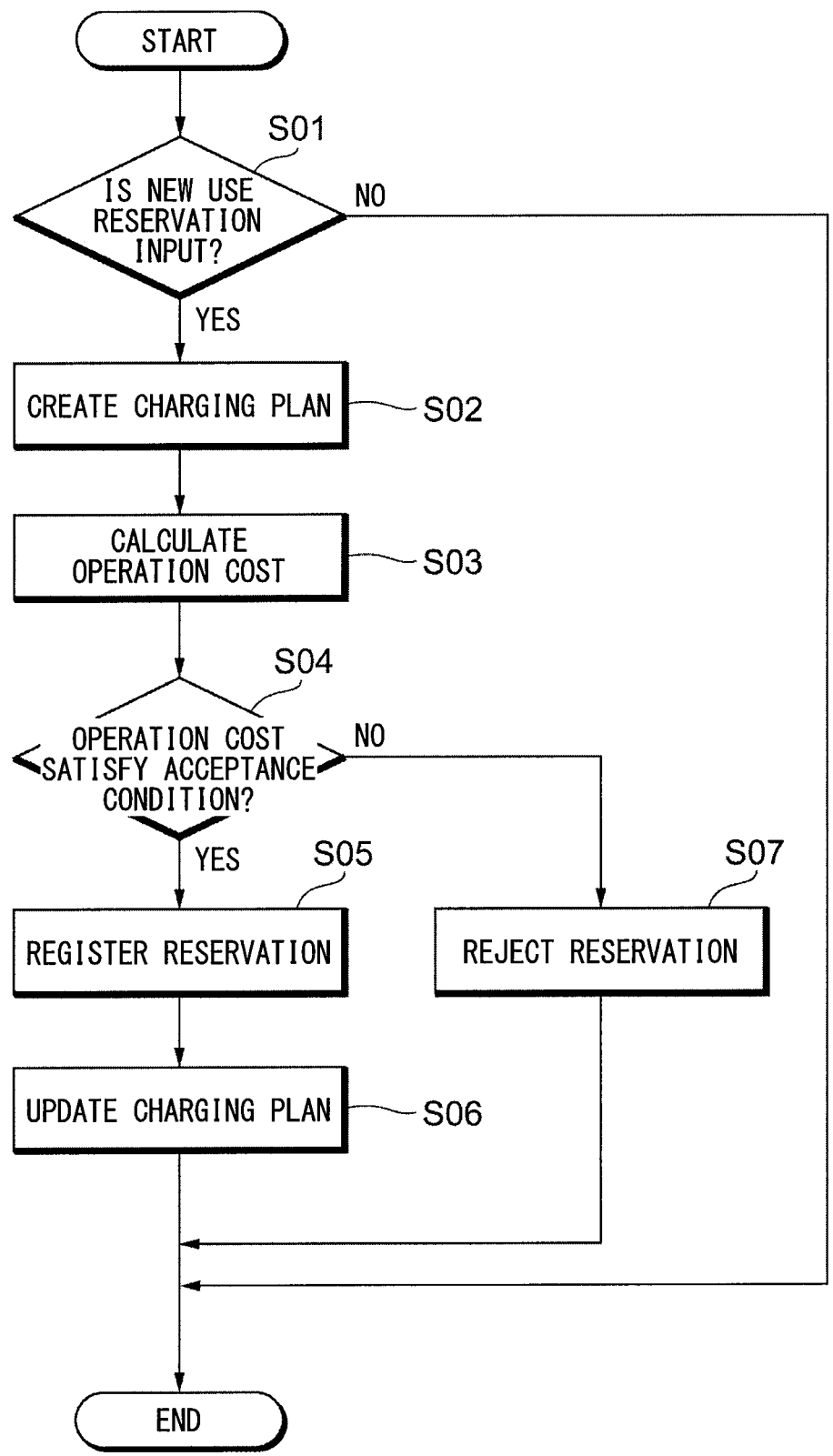
FIG. 4 is a flowchart showing a flow of process executed by the operating system of FIG. 1.

With reference to FIG. 4, specific contents of the process performed by the operating system 100 will be described. The series of process shown in FIG. 4 is repeatedly executed by the operating system 100 every time a predetermined cycle elapses.

In the first step S01, it is determined whether or not the new usage reservation is input into the reservation input unit 120. When the usage reservation has not been input, the series of process shown in FIG. 4 ends. When the usage reservation is input, the process proceeds to step S02.

In step S02, the charging plan is created. As described above, the charging plan shows the operation plan when the input usage reservation is assumed to be responded. The charging plan is created as data of the following form.

$$\{p_{i,j}(\tau|t)\}$$

The above-described "t" expresses the current time point at which the usage reservation is input into the reservation input unit 120, and "$\tau$" expresses each time point in the period from the current time point t to the time point $T_E$ as discrete time point every time a predetermined step period ($\Delta t$) elapses from the current time point t. Furthermore, the time point $\tau$ after period $\Delta t$ has elapsed from the current time point t is "t+$\Delta t$", but in the following description, "t+$\Delta t$" is simplified to be denoted as "t+1" (refer to FIG. 3). Similarly, the time point t after period $\Delta t \times 2$ has elapsed from the current time point t is "t+2$\Delta t$", but in the following, "t+2$\Delta t$" is simplified to be denoted as "t+2". The same is also applied to the subsequent time point $\tau$. The time point t has a value from t+1 to $T_E$.

The above-described "i" is a variable and defined as an integer value for specifying the station 20. Hereinafter, the total number of stations 20 is set to be S, and each station 20 is assigned an individual ID from 1 to S. Therefore, the above-described i will take an integer value from 1 to S.

The above-described "j" is a variable and defined as an integer value for specifying the electric vehicle 30. Hereinafter, the total number of electric vehicles 30 is set to be V, and each electric vehicle 30 is assigned an individual ID from 1 to V. Therefore, the above-described j will take an integer value from 1 to V.

The expression $p_{i,j}(\tau|t)$ indicates the magnitude of the electric power charged in the electric vehicle 30 with ID of j at the station 20 with ID of i at the specific time point $\tau$ after the current time point t. The charging plan $\{p_{i,j}(\tau|t)\}$ is created as data indicating the magnitude of the electric power as described above for the combination of all of variables $\tau$, i, and j. The charging plan $\{p_{i,j}(\tau|t)\}$ also indicates the time zone in which the charging of the electric vehicle 30 is planned to be performed at the station 20 for each of the electric vehicles 30.

In step S02, in addition to the above-described charging plan $\{p_{i,j}(\tau|t)\}$, a vehicle allocation plan and a vehicle position plan are also created. Among the plans, the vehicle allocation plan is created as data of the following form.

$$\{a_{j,k}(t)\}$$

The above-described "k" is a variable and defined as an integer value for specifying all of the usage reservations input so far including the newly input usage reservation. Hereinafter, the total number of the usage reservations is set to be R, and each usage reservation is assigned an individual ID from 1 to R. Therefore, the above-described k will take an integer value from 1 to R. Furthermore, since R increases as the usage reservation is input over time, the R is supposed to be denoted precisely as "R(t)".

When the usage reservation with the ID of k is allocated to the electric vehicle with ID of j, the value of $a_{j,k}(t)$ is set to 1. Otherwise, the value of $a_{j,k}(t)$ is set to 0. In this manner, $a_{j,k}(t)$ represents the allocation of reservation by taking a value of 0 or 1. The vehicle allocation plan $\{a_{j,k}(t)\}$ is created as data indicating the above-described reservation allocation at the current time point t for the combination of all of variables j and k.

The vehicle position plan is created as data of the following form.

$$\{x_{i,j}(\tau|t)\}$$

When the electric vehicle 30 with the ID of j stops at the station 20 with the ID of i, the value of $x_{i,j}(\tau|t)$ is set to be 1. Otherwise, the value of $x_{i,j}(\tau|t)$ is set to 0. The vehicle position plan $\{x_{i,j}(\tau|t)\}$ is created as data indicating the values of $x_{i,j}(\tau|t)$ at the time point t for combination of all of variables t, j, and k. Accordingly, the position of the electric vehicle 30 at each time point t is expressed.

Furthermore, the vehicle position plan $\{x_{i,j}(\tau|t)\}$ must be expressed including a case where the electric vehicle 30 is not stopped at any station 20, that is, a case where the electric vehicle 30 is traveling. Here, a case where the electric vehicle 30 is traveling is expressed as a case where the electric vehicle 30 is stopped at the station 20 with the ID of S+1 (which is actually does not exist). In other words, j in the vehicle position plan $\{x_{i,j}(\tau|t)\}$ takes an integer value from 1 to S+1.

The above-described charging plan $\{p_{i,j}(\tau|t)\}$, the vehicle allocation plan $\{a_{j,k}(t)\}$, and the vehicle position plan $\{x_{i,j}(\tau|t)\}$ are respectively calculated so that an operation cost E shown in the following expression (1) becomes the lowest under a predetermined condition (which will be described later). In other words, as a result of the operation of minimizing the operation cost E under the predetermined conditions, each of the operation plans is created.

[Expression 1]

$$E = \sum_{\tau=t+1}^{T-1} \sum_{i1=1}^{S} \sum_{i2=1}^{S} f_d(i1, i2, \tau) \cdot d_{i1,i2}(\tau) + \sum_{\tau=t+1}^{T} \left\{ f_w(\tau) \sum_{i=1}^{S} w_i(\tau) \Delta_t \right\} + \sum_{\tau=t+1}^{T} \left\{ f_l(\tau) \sum_{i=1}^{S} l_i(\tau) \Delta_t \right\} \quad (1)$$

Each item of the expression (1) will be described. $f_d(i1, i2, \tau)$ in the first term is a function representing the relocation cost required for the staff to perform the relocation (not by the user). $f_d(i1, i2, \tau)$ represents the relocation cost when the relocation from the station 20 with the ID of i1 to the station 20 with the ID of i2 is performed at the time point T. Furthermore, $f_d(i1, i2, \tau)$ specifies only the relocation cost (amount) in the above-described case, and does not specify even whether or not the above-described relocation is actually performed. Whether or not the relocation is actually performed is specified by $d_{i1,i2}(\tau)$.

The reason why $f_d(i1, i2, \tau)$ is a function of t is, for example, considering that the congestion situation and the like of the road changes according to the time zone and the cost required for relocation changes accordingly. In addition, a case where the hourly wage of the staff changes for each time zone, may also be considered.

In expression (1), $d_{i1,i2}(\tau)$ in the first item is a function expressed by the following expression (2).

[Expression 2]

$$d_{i1,i2}(\tau) = \sum_{j=1}^{V} x_{i1,j}(\tau) \cdot x_{i2,j}(\tau+1) \quad (2)$$

In expression (2), $x_{i1,j}(\tau)$ of the right side of the above-described expression (2) is 1 when the electric vehicle 30 with the ID of j stops at the station 20 with the ID of i1 at the time point T. In addition, $x_{i2,j}(\tau+1)$ becomes 1 when the same electric vehicle 30 described above stops at the station 20 with the ID of i2 at the time point t+1 (the time when period $\Delta t$ has elapsed from the time point $\tau$).

Therefore, the value of $d_{i1,i2}(\tau)$ expressed by the expression (2) becomes 1 when the period $\Delta t$ has elapsed from the time point $\tau$ and the electric vehicle 30 with the ID of j moves from the station 20 with the ID of i1 to the station 20 with the ID of i2 by the relocation.

From the above, the first item of the expression (1) represents the relocation cost required for the work for the staff to move the electric vehicle 30 beforehand among the stations 20 different from each other in response to the usage reservation.

Before describing the second and third items of the expression (1), $g_i(\tau)$, $w_i(\tau)$, and $l_i(\tau)$ will be respectively described. Item $g_i(\tau)$ is a value (unit: W) of the solar generable power at the station 20 with the ID of i at the time point $\tau$. Hereinafter, item $g_i(\tau)$ is also referred to as "generable power $g_i(\tau)$".

The generable power $g_i(\tau)$ is, for example, predicted data of sunshine amount obtained from a weather forecast company, or data created in advance based on the place where each of the stations 20 is installed, and the like. The generable power $g_i(\tau)$ is created in advance by the operating system 100 for all of the stations 20 with the ID (that is, i) ranges from 1 to S and all of the time points t in the period from the time point $T_S$ to time point $T_E$.

Furthermore, the value of the solar power which is actually generated at the station 20 at the time point t is not necessarily limited to being equal to the generable power $g_i(\tau)$. For example, even when sufficient sunlight is incident on the solar panel 230 of the station 20, when there is no electric vehicle 30 parked at the station 20, it is not possible to receive the generated solar power. In such a case, the solar panel 230 is configured to automatically limit the power generation. Therefore, it can be said that the generable power $g_i(\tau)$ indicates the maximum value of the solar power that can be generated at the time point t at the station 20.

The item $w_i(\tau)$ is a power value (unit: W) defined as a value obtained by subtracting the value of solar power which is actually generated at the station 20 with the ID of i from the above-described generable power $g_i(\tau)$. The $w_i(\tau)$ can indicate the value of electric power of which the opportunity to generate electricity has been lost, for reasons such as the absence of the electric vehicle 30 from the station 20. Therefore, $w_i(\tau)$ is also denoted below as "opportunity loss power $w_i(\tau)$".

The item $l_i(\tau)$ is a value (unit: W) of the system power that can be supplied at the station 20 with the ID of i at the time point T. Hereinafter, $l_i(\tau)$ is also referred to as "system power $l_i(\tau)$". The system power $l_i(\tau)$, the above-mentioned generable power $g_i(\tau)$, and the opportunity loss power $w_i(\tau)$ are in a relationship represented by the following expression (3).

[Expression 3]

$$w_i(\tau) = l_i(\tau) + g_i(\tau) - \sum_{j=1}^{V} p_{i,j}(\tau|t) \quad (3)$$

For example, in a time zone in which the generable power $g_i(\tau)$ is relatively small, the value of the system power $l_i(\tau)$ is adjusted such that the charging is performed according to the charging plan $\{p_{i,j}(\tau|t)\}$. As a result, the value of the opportunity loss power $w_i(\tau)$ in this time zone is zero.

In addition, the time zone in which the generable power $g_i(\tau)$ is relatively large and the necessity of charging is relatively small, the system power $l_i(\tau)$ becomes 0 and the opportunity loss power $w_i(\tau)$ is larger than 0. In the operation for minimizing the operation cost E of the expression (1), in order to perform the charging according to the charging plan $\{p_{i,j}(\tau|t)\}$ as much as possible using the solar power, the value of the system power $l_i(\tau)$ at each point of the time $\tau$ is appropriately adjusted.

In the expression (1), $f_w(\tau)$ in the second item represents the price of the solar power per 1 watt hour in terms of money. The item $f_w(\tau)$ may be, for example, described as a function indicating the power selling price at the time point $\tau$.

The second item of the expression (1) is obtained by multiplying the sum of the opportunity loss power $w_i(\tau)$ for all of the stations 20 by the above-described $f_w(\tau)$ and integrating the product over the period after the current time point t. In other words, during the remaining period of the service providing period, the second item corresponds to the price of the solar power of which the opportunity for power generation is lost.

In the expression (1), $f_i(\tau)$ in the third item represents the price of the system power per 1 watt hour in terms of money. The $f_i(\tau)$ corresponds to power purchase price.

The third item of the expression (1) is obtained by multiplying the system power $l_i(\tau)$ for all of the stations 20 by the above-described $f_i(\tau)$ and integrating the product over the period after the current time point t. In other words, in the remaining period of the service providing period, the third item indicates the system charging cost required to perform the charging by supplying the system power to each of the electric vehicles 30.

In step S02 of FIG. 4, the charging plan $\{p_{i,j}(\tau)\}$, the vehicle allocation plan $\{a_{j,k}(t)\}$, and the vehicle position plan $\{x_{i,j}(\tau|t)\}$ are created so that the operation cost E which is the sum of the first item, the second item, and the third item as described above has a minimum value. These are plans created by calculation performed by the charging plan creating unit 140 while calculating the operation cost E by the cost calculating unit 150 every time.

Furthermore, when performing the calculation for minimizing the operation cost E, various initial conditions and various constraint conditions are set. The operation for the minimization is performed under the plural conditions. As the initial condition, for example, the current position of each electric vehicle 30 is set. The initial condition regarding the current position corresponds to each value of the vehicle position plan $\{x_{i,j}(0|t)\}$ when $\tau=0$.

In addition, SOC (the amount of stored power) of each storage battery mounted in each electric vehicle 30 at the current time point ($\tau|=0$) is also set as an initial condition. Information indicating such an initial SOC is acquired in advance by, for example, communication performed between the electric vehicle 30 and the charging facility 210.

As the constraint condition, for example, the target value SOC of each storage battery mounted in each electric vehicle 30 at time point $T_E$ may be set. In other words, the final target value (target amount of stored power) of each SOC at the point of time when the service providing period ends is set. The SOC at service end time is considered to be desirable when the SOC is as large as possible. When the SOC is uniformly set to 100%, for example, there is a possibility that the opportunity loss power $w_i(\tau)$ of the next day becomes large. Therefore, the larger SOC is not necessarily more desirable. The SOC of the service end time is set to, for example, uniformly 50%.

By setting the constraint condition as described above, creation of the charging plan $\{p_{i,j}(\tau|t)\}$ and the like by the charging plan creating unit 140 is performed such that the amount of power stored in each electric vehicle 30 at the vehicle-sharing service end time is equal to the target of the stored power a mount.

As another constraint condition, while the electric vehicle 30 is traveling, the power consumption amount during the elapse of the step period ($\Delta t$), that is, the amount of a decrease in the stored power amount may be individually set for each electric vehicle 30.

As another constraint condition, the upper limit value and the lower limit value of the SOC during the service operation may be individually set for each electric vehicle 30. Accordingly, the charging plan $\{p_{i,j}(\tau|t)\}$ or the like by the charging plan creating unit 140 is created so that the SOC of each electric vehicle 30 constantly falls within the range from the lower limit value to the upper limit value during the service operation.

Figure 5:
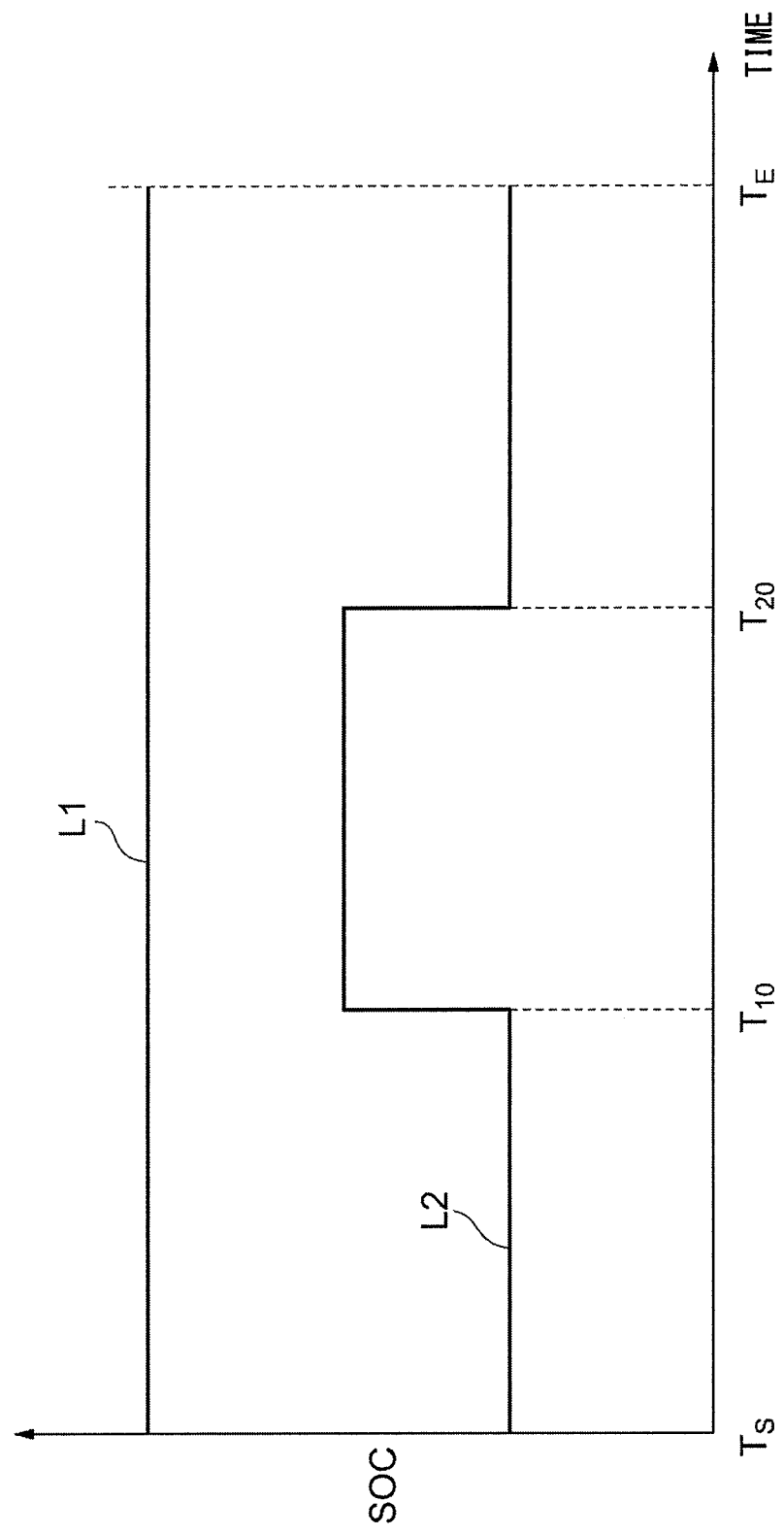
FIG. 5 is a view showing a condition set with respect to the amount of power stored in an electric vehicle.

FIG. 5 shows an example of transition (line L1) of the upper limit value of the SOC set as the constraint condition and transition (line L2) of the lower limit value of the SOC set as the constraint condition. In the example of FIG. 5, the upper limit value of the SOC is set to be uniformly 100%, and the value thereof never changes in the middle.

Meanwhile, the lower limit value of the SOC is set so as to temporarily rise in the period from time $T_{10}$ to time $T_{20}$. For example, when the time zone in which the lending frequency of the electric vehicle 30 is high is known in advance, it is desirable to temporarily increase the lower limit value of the SOC in the time zone in this manner. Accordingly, such a situation that the amount of power stored in the electric vehicle 30 extremely decreases during the traveling and becomes unable to travel can be prevented. Furthermore, the conditions shown in FIG. 5 are merely examples, and different conditions may be set. For example, a condition may be set such that the upper limit value of the SOC changes with time.

The upper limit value and the lower limit value of charging electric power when the electric vehicle 30 is charged may be added as a further constraint condition. Furthermore, when considering the power interchange between the electric vehicles 30, the upper limit value and the lower limit value of the electric power discharged from the electric vehicle 30 may be added as further constraint conditions.

When performing the operation for minimizing the operation cost E, for example, it is needless to say that the constraint conditions which are necessary for describing the actual situation, such as a condition that the number of electric vehicles 30 allocated to one usage reservation is limited to "1", are used in addition to the above constraint conditions.

Returning to FIG. 4, the description will be continued. When the charging plan $\{p_{i,j}(\tau|t)\}$ and the like are created in step S02, the process proceeds to step S03. In step S03, an operation cost E is calculated. The value of the operation cost E calculated here is a value obtained as a result of minimizing the expression (1) in step S02. In other words, the operation cost E is a value of the operation cost E when the service is operated according to the charging plan $\{p_{i,j}(\tau|t)\}$ and the like created in step S02.

In step S04 following step S03, it is determined whether or not the operation cost E calculated in step S03 satisfies the acceptance condition. The acceptance condition in the present embodiment is set to such a condition that the difference value obtained by subtracting the operation cost E calculated this time from the operation cost E calculated last time is kept equal to or less than a predetermined threshold value. The above-described difference value corresponds to the increase amount of the operation cost E caused by responding to the new usage reservation input to the reservation input unit 120 in step S01.

When the operation cost E satisfies the acceptance condition, that is, when the difference value is kept equal to or less than the threshold value, the process proceeds to step S05. A case where the process proceeds to step S05 means that the increase amount of the operation cost E is relatively low even when responding to the new usage reservation.

Therefore, in step S05, it is confirmed to respond to the new usage reservation input in step S01, and the usage reservation is registered.

At this time, from the result sending unit 130, the reservation result indicating that it is possible to respond to the usage reservation is sent to the personal computer 40 of the user. In addition, the reservation result also includes information which specifies the electric vehicle 30 allocated to the usage reservation.

In step S06 following step S05, each of the charging plan $\{p_{i,j}(\tau|t)\}$, the vehicle allocation plan $\{a_{j,k}(t)\}$, and the vehicle position plan $\{p_{i,j}(\tau|t)\}$ is updated from a temporary plan to a confirmed plan. After this, the service is operated according to the confirmed charging plan $\{p_{i,j}(\tau|t)\}$ and the like.

In step S04, when the operation cost E does not satisfy the acceptance condition, the process proceeds to step S07. A case where the process proceeds to step S07 means that the increase amount of the operation cost E is relatively large even when responding to the new usage reservation. In such a case, there is a high possibility of confusion in the operation of the service, for example, it is necessary to substantially change the time schedule of the staff for the relocation.

Therefore, in step S07, it is confirmed not to respond to the new usage reservation input into the reservation input unit 120 in step S01, and the usage reservation is rejected. From the result sending unit 130, the reservation result indicating that it is not possible to respond to the usage reservation is sent to the personal computer 40 of the user. In this case, all the operation plans created in step S02 is discarded. In other words, neither of the charging plan $\{p_{i,j}(\tau|t)\}$, the vehicle allocation plan $\{a_{j,k}(t)\}$, and the vehicle position plan $\{p_{i,j}(\tau|t)\}$ is updated.

As a result of the process as described above, each time the usage reservation is newly input into the reservation input unit 120, the charging plan $\{p_{i,j}(\tau|t)\}$ and the like are updated according to the current situation (current position or SOC of each electric vehicle 30). Furthermore, in the middle of the service providing period, the total number of the electric vehicles 30 may change due to the failure of some of the electric vehicles 30 or the introduction of the new electric vehicle 30. In this case, by changing the value of V according to the change, the vehicle position plan $\{p_{i,j}(\tau|t)\}$ may be created. In this manner, appropriate service operation can be performed while responding flexibly to changes in the actual situation.

Furthermore, even when the usage reservation is not input into the reservation input unit 120, the creation and update of the charging plan $\{p_{i,j}(\tau|t)\}$ and the like by the charging plan creating unit 140 are performed periodically at a predetermined period. The process performed for this will be described with reference to FIG. 6.

Figure 6:
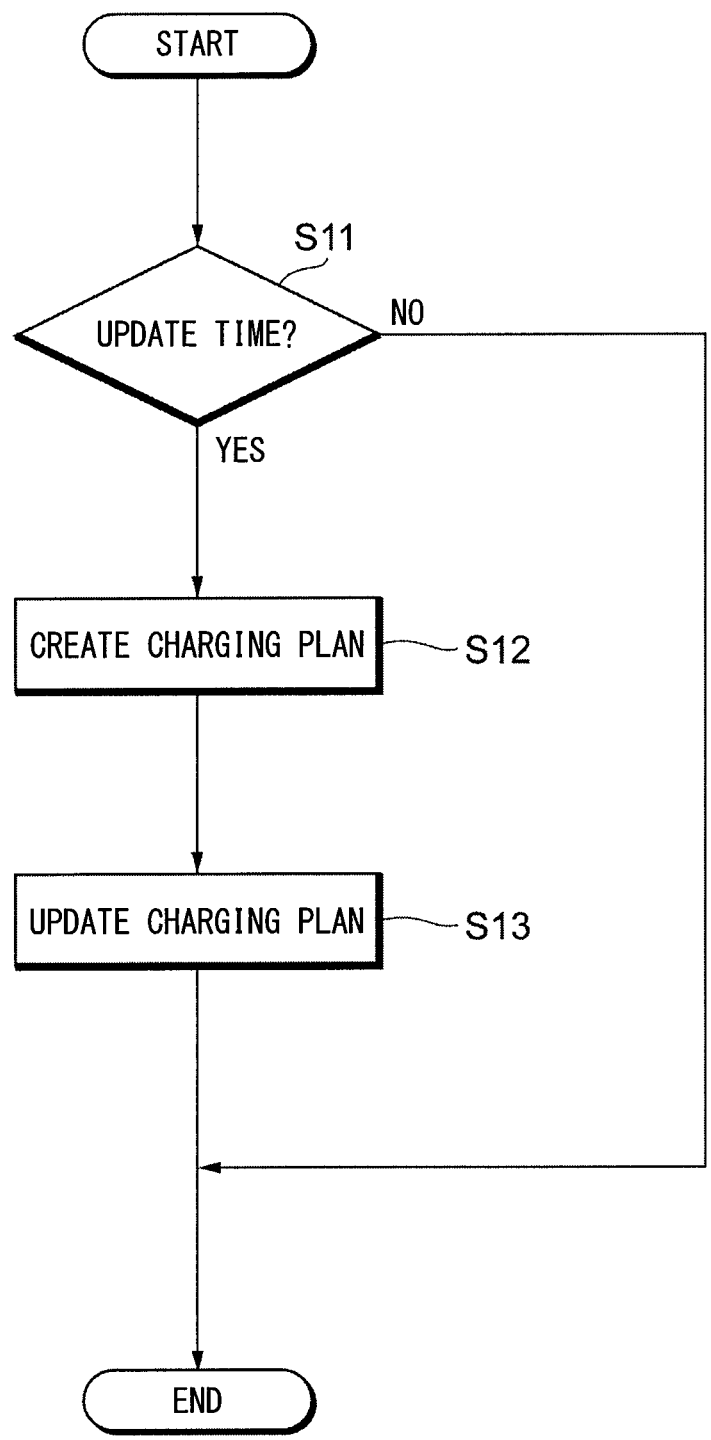
FIG. 6 is a flowchart showing a flow of process executed by the operating system of FIG. 1.

The series of process shown in FIG. 6 is repeatedly executed by the operating system 100 every time a predetermined cycle elapses. In addition, the process is performed in parallel with the series of processes shown in FIG. 4.

In the first step S11, it is determined whether or not the current time point is the update time point. The update time point is one of multiple time points preliminarily set in the service target period as time points for periodically updating the charging plan $\{p_{i,j}(\tau|t)\}$ and the like. In the present embodiment, each time point after the time point $T_S$ by the predetermined step period (for example, 15 minutes) is previously set as the above-described update time point.

When the current time point is not the update time point, the series of process shown in FIG. 6 is ended. When the current time point is the update time point, the process proceeds to step S12.

In step S12, the same process as that performed in step S02 in FIG. 4 is performed. At this time, since there is no new usage reservation added, a charging plan $\{p_{i,j}(\tau|t)\}$ and the like are created such that the allocation of the electric vehicle 30 is performed to each usage reservation input so far (and registered as a reservation that can be responded). The created charging plan $\{p_{i,j}(\tau|t)\}$ and the like reflects the information on the stored power amount or the current position of each electric vehicle 30 at the present moment.

In step S13 following step S12, each of the charging plan $\{p_{i,j}(\tau|t)\}$, the vehicle allocation plan $\{a_{j,k}(t)\}$, and the vehicle position plan $\{x_{i,j}(\tau|t)\}$ which are created in step S12 is updated to a confirmed plan.

As described above, in the operating system 100 according to the present embodiment, although the operation that responds to the request from the user as much as possible (usage reservation) is basically performed, when the operation cost E created with consideration of the charging by the solar power and the like does not satisfy the predetermined acceptance condition, the operation is performed such that the request from the user is exceptionally rejected.

Accordingly, balance between the charging of the electric vehicle 30 by efficiently using the solar power and the lending of the electric vehicle 30 in response to the request of the user can be appropriately maintained. As a result, the vehicle-sharing service can be operated more efficiently.

Various changes or improvements can be added to the operating system 100 described above. For example, the acceptance condition used in step S04 in FIG. 4 may be set to such a condition that the value of the operation cost E calculated in step S03 is kept equal to or less than the predetermined threshold value. In other words, such a condition that the operation cost E in response to the new usage reservation is kept equal to or less than the threshold value may be set as the acceptance condition.

A method for creating the charging plan $\{p_{i,j}(\tau|t)\}$ and the like described with reference to FIG. 4 is a method for changing the entire vehicle allocation plan $\{a_{j,k}(t)\}$ when the new usage reservation is input. In other words, even after the allocation of the electric vehicle 30 to the existing usage reservation is performed, when the new usage reservation is input, all the existing allocations are discarded and the whole is reallocated. Therefore, depending on the scale of the vehicle-sharing system 10, the calculation load on the operating system 100 becomes extremely large, and there is a possibility that it takes a long time to create the charging plan $\{p_{i,j}(\tau|t)\}$.

As a countermeasure against this, only the allocation of the electric vehicle 30 with respect to the newly input usage reservation may be performed, and the allocation which has been confirmed so far may be maintained without change. In other words, when a new usage reservation is input into the reservation input unit 120, the charging plan creating unit 140 creates each of the charging plan $\{p_{i,j}(\tau|t)\}$, the vehicle allocation plan $\{a_{j,k}(t)\}$, and the vehicle position plan $\{x_{i,j}(\tau|t)\}$ under the constraint that the allocation of the electric vehicle 30 to the existing usage reservation input before the new usage reservation is maintained without change.

In this case, when minimizing the operation cost E of the expression (1), the data of k from 1 to R−1 in the vehicle allocation plan $\{a_{j,k}(t)\}$ is not changed and this is used as the constraint condition. Therefore, what is obtained as a result of minimizing the operation cost E is a part (that is, $a_{j,R}(t)$)

other than the description above in the vehicle allocation plan {a$_{j,k}$(t)}, the charging plan {p$_{i,j}$(τ|t)}, and the vehicle position plan {x$_{i,j}$(τ|t)}.

According to the above-described method, since the existing allocation is not changed, the calculation load for creating the charging plan {p$_{i,j}$(τ|t)} and the like can be substantially reduced. As a result, a response to the procedure of the usage reservation (that is, reservation result) can be returned to the user in a short period of time.

During the service operation, the distribution of the electric vehicle 30 may be unbalanced, and the number of electric vehicles 30 parked at some stations 20 may extremely increase. In this case, the electric vehicle 30 must be moved from the station 20 to another station 20 in order to make a state where it is possible to respond to the usage reservation from the user. Therefore, the relocation cost increases.

In such a case, the operation cost E can further be reduced by changing the usage fee notified to the user by the fee presenting unit 110 according to the situation. For example, the usage fee for a usage mode (traveling route) in which the borrowing is performed at the station 20 having a large number of parked electric vehicles 30 and the returning is performed at the station 20 having a small number of parked electric vehicles 30, may be notified to the user as a fee which is more inexpensive than the usage fee in other modes. When the usage in such a mode increases, the number of relocations by the operation of the staff decreases, and thus, the relocation cost in the operation cost E can be limited.

In the present embodiment, the operation cost E is calculated to include a cost required for relocation, a cost associated with the use of the system power, and a cost associated with an increase in opportunity loss power. In addition to these, the operation cost E may be calculated so as to include other factors. For example, as a result of rejecting a part of the usage reservation, the expression (1) for calculating the operation cost E may be changed so as to include a cost associated with the reduction of the usage fee paid by the user.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

What is claimed is:

1. A system comprising:
   an operating system for a vehicle-sharing service;
   at least one solar panel located at each of a plurality of stations and configured to generate and supply solar power to a plurality of electric vehicles, the plurality of stations being disposed within a specific service area;
   at least one electric power system located at each of the plurality of stations and configured to supply system power to the plurality of electric vehicles;
   wherein:
   the vehicle-sharing service provides temporary lending of a particular electric vehicle from the plurality of electric vehicles available for temporary lending in response to a request from a user;
   the particular electric vehicle is provided from one of the plurality of stations disposed within the specific service area;
   each of the plurality of stations has a charging facility which is configured to supply solar power from the at least one solar panel located at the station and system power from the at least one electric power system located at the system to the plurality of electric vehicles for charging the plurality of electric vehicles in a time zone while the plurality of electric vehicles are vchicic is not lent out, the operating system comprising:
   one or more computers having one or more processors; and
   one or more computer readable non-transitory storage media storing instructions that are executable by the one or more processors to:
   input a usage reservation of the electric vehicle made by the user on a user device;
   send, to the user, a reservation result indicating whether the usage reservation is acceptable;
   create a charging plan for the plurality of electric vehicles during a planned time zone, the planned time zone being a duration in which charging of the plurality of electric vehicles is performed at the plurality of stations;
   create a vehicle position plan indicating, for each of the plurality of electric vehicles, a position of the electric vehicle at one of the plurality of stations when each of the plurality of electric vehicles is not being temporary lended;
   calculate an operation cost of the vehicle-sharing service at least based on a prediction of available solar power to be generated by the at least one solar panel at each of the plurality of stations and supplied to the plurality of electric vehicles, the operation cost including a relocation cost in response to the vehicle position plan requiring that at least one vehicle of the plurality of electric vehicles be moved amongst the plurality of stations and a charging cost of charging the plurality of electric vehicles,
   wherein:
   the charging plan and the vehicle position plan are is created to minimize that the calculated operation cost;
   each time an input of the usage reservation is made by the user,
   a temporary charging plan and a temporary vehicle position plan are created based on and in response to the usage reservation being newly input, and
   a temporary operation cost based on the temporary charging plan and the temporary vehicle position plan is calculated, and
   in a case where the temporary operation cost calculated based on the temporary charging plan and the temporary vehicle position does not satisfy a predetermined acceptance condition, the reservation result indicating the usage reservation is unacceptable is transmitted to the user device, and
   in a case where the temporary operation cost satisfies the predetermined acceptance condition, the reservation result indicating the usage reservation is acceptable is transmitted to the user, the charging plan is updated to the temporary charging plan, and the vehicle position plan is updated to the temporary vehicle position plan;
   the predetermined acceptance condition is satisfied when an amount of increase in the updated operation cost in response to the usage reservation being newly input is kept equal to or less than a predetermined threshold value;

at least one of the plurality of vehicles is relocated amongst the plurality of stations in response to the vehicle position plan requiring that the at least one of the plurality of vehicle be relocated amongst the plurality of stations; and the plurality of vehicles are charged with solar power generated by the at least one solar panel located at each of the plurality of stations and system power from the at least one electric power system located at each of the plurality of stations according to the charging plan.

2. The operating system according to claim 1, wherein the charging plan is created based on an amount of power stored in the electric vehicle at a current time point.

3. The operating system according to claim 1, wherein the charging plan is created such that an amount of power stored in the electric vehicle at an end time point of the vehicle-sharing service is equal to a predetermined target value of the amount of power stored in the electric vehicle.

4. The operating system according to claim 1, wherein the charging plan is created such that an amount of power stored in the electric vehicle remains within a predetermined range during an entire operation period of the vehicle-sharing service.

5. The operating system according to claim 4, wherein the predetermined range is set to be a range that varies depending on time zones.

6. The operating system according to claim 1, wherein:

the one or more computer readable non-transitory storage media storing further instructions that are executable by the one or more processors to:

notify, to the user, a usage fee to be paid for lending the particular electric vehicle in response to an input of the usage reservation, and to present a more inexpensive usage fee for the usage reservation compared with other usage reservations, in response to the usage reservation being made for a route having a lower relocation cost compared with other routes.

* * * * *